(12) United States Patent
Dicke (10) Patent No.: US 12,088,775 B2
(45) Date of Patent: Sep. 10, 2024

(54) PROCESS FOR CREATING AND FOR COMPARING COLOR PROFILES

(71) Applicant: SWISS KRONO Tec AG, Lucerne (CH)

(72) Inventor: Sebastian Dicke, Bantikow (DE)

(73) Assignee: SWISS KRONO Tec AG, Lucerne (CH)

( * ) Notice: Subject to any disclaimer, the term of this patent is extended or adjusted under 35 U.S.C. 154(b) by 0 days.

(21) Appl. No.: 18/038,301

(22) PCT Filed: Nov. 22, 2021

(86) PCT No.: PCT/EP2021/082501
§ 371 (c)(1),
(2) Date: May 23, 2023

(87) PCT Pub. No.: WO2022/112173
PCT Pub. Date: Jun. 2, 2022

(65) Prior Publication Data
US 2024/0007581 A1 Jan. 4, 2024

(30) Foreign Application Priority Data
Nov. 24, 2020 (EP) .................................. 20209466

(51) Int. Cl.
*H04N 1/60* (2006.01)
(52) U.S. Cl.
CPC ......... *H04N 1/6097* (2013.01); *H04N 1/6008* (2013.01)
(58) Field of Classification Search
CPC .......................... H04N 1/6008; H04N 1/6097
See application file for complete search history.

(56) References Cited

U.S. PATENT DOCUMENTS 6,771,400 B2 * 8/2004 Kleiman ............... G01J 3/0264
358/509
2017/0259581 A1 9/2017 Pfeiffer
(Continued)

FOREIGN PATENT DOCUMENTS

DE 10359322 A1 7/2004
DE 102010007125 A1 8/2011
(Continued)

OTHER PUBLICATIONS

Ivanovici et al., "Reference-based Color Texture Digitization and Analysis of Wooden Surfaces", 2017 International Conference on Optimization of Electrical and Electronic Equipment (OPTIM) & 2017 International Aegean Conference on Electrical Machines and Power Electronics (ACEMP), 2017, pp. 989-994.

*Primary Examiner* — Barbara D Reinier
(74) *Attorney, Agent, or Firm* — The Webb Law Firm (57) ABSTRACT

The present invention relates to a process for comparing a reference colour profile or the color space value of the reference color profile of an analogue reference pattern with a decorative-element-specific color profile or the color space value of the decorative-element-specific color profile of a digital or analogue decorative element. In the course of the process, a reference color profile is created by reading in and storing measurement data of at least one portion of an analogue reference pattern by means of a hyperspectral area measuring device. According to the invention, a decorative-element-specific color profile is created either from the digital data of a digital decorative element or using hyperspectral area measurement of at least one portion of an analogue decorative element.

13 Claims, 2 Drawing Sheets

(56) References Cited

U.S. PATENT DOCUMENTS

2018/0321597 A1* 11/2018 Javaheri .............. G03F 7/70625
2023/0081185 A1* 3/2023 Dicke .................... H04N 1/603
                                                          358/1.9

FOREIGN PATENT DOCUMENTS

DE       102017202031 A1    9/2017
EP            3020565 A1    5/2016
EP            3578939 A1   12/2019

* cited by examiner

FIG 1

PROCESS FOR CREATING AND FOR COMPARING COLOR PROFILES

CROSS REFERENCE TO RELATED APPLICATIONS

This application is the United States national phase of International Patent Application No. PCT/EP2021/082501 filed Nov. 22, 2021, and claims priority to European Patent Application No. 20209466.0 filed Nov. 24, 2020, the disclosures of which are hereby incorporated by reference in their entireties.

BACKGROUND OF THE INVENTION

Field of the Invention

The present invention relates to a method for comparing a reference color profile or the color space size of the reference color profile of an analog reference pattern with a decoration-specific color profile or the color space size of the decoration-specific color profile of a digital or analog decoration. In the course of the method, a reference color profile is generated by reading in and storing measurement data of at least one segment of an analog reference pattern with a hyperspectral two-dimensional measuring instrument. According to the invention, a decoration-specific color profile is generated either from the digital data of a digital decoration or by hyperspectral two-dimensional measurement of at least one section of an analog decoration.

Description of the Related Art

Color is an essential feature of a printing decoration, which may be generated by various techniques, for example intaglio or digital printing. In each of these techniques, the desired appearance of the printing is achieved by overlaying different pigment layers of the primary colors. The intaglio method is a printing technique in which the elements to be imaged are present as depressions in a printing form, for example a printing roll, which is inked before the printing. The printing dye is primarily located in the depressions and is transferred onto the object to be printed on because of the application pressure of the printing form and adhesion forces. In digital printing, on the other hand, the printing image is transferred directly from a computer into a digital printer, for example a laser printer or inkjet printer, the use of static printing forms being obviated. In digital printing, color models that comprise different primary colors and/or special colors are used. For example, the color models comprise 1, 2, 3, 4, 5, 6 or 7 primary and/or special colors. One color model conventionally used in digital printing comprises the primary colors cyan, magenta, yellow and black (CMYK). The CMYK color model is a subtractive color model, the abbreviation CMYK standing for the three color components cyan, magenta, yellow and the black component, or key, as color depth. With this color system, it is possible to image a color space (gamut) that satisfies many requirements from a wide variety of fields. In another color system, red is used instead of magenta, this being referred to as the CRYK color model. Furthermore, for example, it is possible to use a color model that comprises two different yellow hues, one reddish and one yellowish. This color system is referred to as the CRY1Y2K color model. The use of color models with other and/or more special colors are also known. For example, color models with 6 colors.

Suitable printing substrates are for example paper, glass, metal, films, wood-based material panels, in particular MDF or HDF panels, WPC panels, veneers, lacquer layers, plastic panels and inorganic carrier panels. Wood-based material panels are preferred according to the invention.

Wood-based material panels provided with a decoration are often used in the production of flooring laminate or in the form of wall and ceiling cladding elements. There are many approaches for the decoration of wood-based material panels. For instance, in the past the covering of wood-based material panels with a decoration paper has frequently been used, there being no limits to the variety of differently patterned decoration papers. As an alternative to the use of decoration papers on wood-based material panels, the possibility of directly printing on wood-based material panels has been developed, printing on paper and subsequent lamination thereof or direct coating onto the wood-based material panels being obviated. The printing techniques primarily used for this are the intaglio method and the digital printing method.

One open problem, which constitutes a central theme in all fields of the color-based or color-processing industry, consists in achieving a high degree of color fidelity, in other words the ability to reproduce predetermined colors with minimal chromatic difference in relation to an original, in particular also on different carrier materials or printing substrates. An essential step for this is inter alia determining the color space in the preprinting stage. Furthermore, constant monitoring of the printing quality should be ensured throughout the printing process. One central quality requirement in all printing methods is inter alia that color deviations between a prototype of a decoration and further printing of the decoration should occur only below a predetermined setpoint value.

Central techniques in printing are, as already mentioned, the intaglio method and the digital printing method. Digital printing makes it possible to produce a printing image having a particularly high quality due to a higher resolution, and furthermore allows a wider application spectrum with high flexibility. At the start of a printing process, it is initially necessary to determine whether the decoration to be printed can be imaged onto a particular printing substrate with a particular printing method under defined printing parameters, such as the printer used and the colors used. For this purpose, the color space with defined printing parameters is determined in the preprinting stage. The color space determined in the preprinting stage therefore represents the maximum possible bandwidth of printable colors in the printing process under the printing parameters used. Printing parameters in the sense of the invention refer to all conditions that influence the printing. In particular, they include:
  ink used,
  use of a primer and amount of primer used,
  printer used,
  viscosity of the liquids used,
  ambient conditions, in particular temperature and air humidity,
  printing heads of the printer and software control of the printer,
  condition of the surface of the printing substrate,
  age and formulation of the primer used and/or of the ink used.

A primer or an undercoat is used in order to keep color deviations between the printed decorations of a production batch, or between identical printed decorations of different production batches, as small as possible from the outset. Furthermore, the use of a primer reduces the amount of ink that needs to be used for printing. Without a primer, the ink sinks deeply into the paper and a larger amount of ink needs to be used in order to achieve a desired printing result. Since the primer is much less expensive than printing ink, there is a significant cost saving associated with its use.

The decoration to be printed is likewise defined by a color space, which contains all colors that occur in the decoration to be printed. Whether a decoration can be imaged with particular printing parameters on a particular printing substrate may be established by comparing the color space of the decoration to be printed with the color space that has been determined in the preprinting stage. If the color space of the decoration to be printed falls within the color space or is identical to the color space that has been determined in the preprinting stage, the decoration can be printed onto the printing substrate under the printing parameters used in the preprinting stage. If, however, the color space of the decoration to be printed falls fully or partially outside the color space that has been determined in the preprinting stage, the decoration cannot be printed onto the printing substrate under the printing parameters used in the preprinting stage. Determination of the color space is therefore essential for achieving a desired color fidelity in the printing process.

In order to determine the color space in the preprinting stage, digital color profile targets are conventionally compiled by means of a software (for example Colorgate) and output on a particular output instrument and a particular printing substrate under defined printing parameters. A color profile target in this case consists of an area that has a particular color or in particular color decoration.

It is in this case necessary to be aware that especially printing parameters such as printing method, printer and color as well as the printing substrate have a great influence on the way in which a printing pattern appears in the printed state. For example, the same printing pattern appears very differently on a glossy paper than on a matt granular canvas. While the glossy printout has high contrast and saturated colors, the effect of the canvas printing has a much lower contrast, less color and often more warmth. Furthermore, other printing parameters such as the application of a primer on the carrier substance, the temperature during the printing process or the ink used have an influence on the colors represented.

The aforementioned printing parameters consequently influence the colors that can be represented on a printing substrate during the printing process, and thus also the colors which are represented on the printing substrate when printing the color profile target. The color space of the digitally compiled color profile targets therefore generally does not correspond to the color space of the printed color profile targets.

In the preprinting stage, the color profile targets printed onto a printing substrate under defined printing parameters (primer, ink, temperature, etc.) are therefore measured. The measured color profile targets form a color profile. The color profile therefore reflects the color space actually representable on a particular printing substrate under defined printing parameters. Various optical measurement methods are available for this from the prior art, for example "Cube" from Colorgate as well as spectral point measuring instruments, for example "X-Rite iOne".

However, the methods known from the prior art have crucial disadvantages. In general, a color profile target has an area of from 0.5 cm$^2$ to 1 cm$^2$. The spectral point measuring instruments register only a small section of the printed color profile targets, which is already small. With spectral point measurement, only a section of the area of the printed color profile targets can be measured, while the information that is contained in the rest of the area of the printed color profile target cannot be used. Pointwise registering may, however, lead to inaccuracies in the measurement result. For various reasons, a color profile target may sometimes not have a homogeneous coloration, but may contain color deviations. This may, for example, be caused by a nonuniform printing substrate, a defective primer layer or errors in the printing process. If the color profile target is then measured pointwise at a place which has such a color deviation, the color profile will be determined incorrectly for this printed color profile target.

For example, if a dark point is measured during the spectral point measurement of a color profile target which has very bright yellow, the color profile and therefore the color space will be limited even though this does not correspond to the color profile, or color space, that can actually be represented. The color space determined in the preprinting stage is therefore too small. This may sometimes lead to a decoration, which is intended to be printed, being classified as not printable on the selected printing substrate with these printing parameters because the color space of the decoration is larger than the color space determined in the preprinting stage, even though this is not true.

Conversely, it may occur that too large a color space is incorrectly determined in the preprinting stage. For example, a bright luminous point in a yellow color profile target could be measured, even though it is not representative of the color profile target. Consequently, a decoration may be classified as printable even though the color space of the decoration is in fact larger than the color space that can actually be represented.

Despite defined conditions, under which the color profile targets are printed and measured, with the methods of the prior art there is therefore the risk that the measured color profile does not correspond to the color profile that can actually be represented. In addition, a different color profile, or a different color space, may be determined when repeating the determination of the color profile, or of the color space, under identical conditions.

Furthermore, the purely optically based systems of the prior art have restrictions since they work only on the basis of the chips and/or sensors integrated in them, which are based on photosensitive image sensors.

One essential problem in the printing process consists in achieving a high degree of color fidelity, that is to say the ability to render predetermined colors with minimal chromatic difference in relation to an original in a digital printing process. This is a central requirement on the part of the customers, who expect the most exact possible rendition of a printing template in the printing process.

An important step is in this case accurate determination of the color profile or color space in the preprinting stage. It is furthermore of central importance to check the color fidelity of the printed decorations regularly during the printing process as well, in order to ensure a high printing quality.

For example, the following methods are known from the prior art:

DE 10 2017 202 031 A1 concerns a correction of color deviations in digital printing machines. The purpose of the method is to allow true-color rendition of a digital printing template in the printing process. A test pattern is in this case measured with a colorimeter. By the use of colorimeters, pointwise measuring of the test pattern is carried out, with the disadvantages associated therewith.

EP 3 020 565B1 concerns a method for generating true-color and true-detail renditions of a printing decoration with various printing techniques. The aim of the method is to generate decoration prints on carrier materials with a comparable perceived quality, regardless of whether the decoration was printed digitally or in an analog fashion.

DE 10 2010 007 125 A1 relates to a method for providing and using decoration data. The decoration data are in this case obtained by scanning patterns of existing decorations, laminates and/or authentic materials. The key aspect of the method is decoration data management using a central decoration database. The true-color rendition of the patterns, which have been digitized in the method, by a printing process is not an aim of the method.

SUMMARY OF THE INVENTION

An object of the present invention is to remedy the disadvantages of the prior art, and to provide a method with which the highest possible color fidelity of printed decorations can be ensured in the entire printing process.

The object is achieved by a method for comparing a reference color profile or the color space size of the reference color profile of an analog reference pattern with a decoration-specific color profile or the color space size of the decoration-specific color profile of a digital or analog decoration, characterized in that the method comprises the steps:
  a. reading in and storing measurement data of at least one segment of an analog reference pattern with a hyperspectral two-dimensional measuring instrument;
  b. compiling a reference color profile by means of software;
  c. optionally determining and storing the color space size of the reference color profile by means of software;
  d. compiling and storing a decoration-specific color profile either from the digital data of a digital decoration or by hyperspectral two-dimensional measurement of at least one section of an analog decoration;
  e. optionally determining and storing the color space size of the decoration-specific color profile by means of software;
  f. comparing the reference color profile and the decoration-specific color profile or the color space size of the reference color profile and the color space size of the decoration-specific color profile.

The method according to the invention comprises comparing the reference color profile or the color space size of the reference color profile of an analog reference pattern with a decoration-specific color profile or the color space size of the decoration-specific color profile of a digital or analog decoration.

According to the method according to the invention, at least one two-dimensional segment of an analog reference pattern is in this case measured with a hyperspectral two-dimensional measuring instrument. The data are subsequently stored. The hyperspectral two-dimensional measuring instrument carries out a hyperspectral two-dimensional measurement, for which a hyperspectral sensor system is used.

A "hyperspectral sensor system" is intended to mean a sensor system which can record images of very many wavelengths lying close together. The eye sees the world multispectrally at the wavelengths of the primary colors red, green and blue. Hyperspectral systems record data of from 20 to 250 different channels, which extend from wavelengths in the ultraviolet range to the longwave infrared. The advantage of hyperspectral systems is that images are acquired and stored with a very high detail accuracy and resolution.

The hyperspectral two-dimensional measurement may be carried out by means of a hyperspectral system, for example having a hyperspectral camera, or particularly preferably by means of a hyperspectral scanner. A corresponding method for generating hyperspectral images is known in the prior art as ACMS® (Advanced Color Measurement System). Hyperspectral systems have a multiplicity of detectors. As a result of the recording, a hyperspectral data cube having two spatial dimensions and one spectral dimension is obtained. Four basic techniques are available for generating this hyperspectral data cube. With a so-called snapshot, the entire data set is delivered with a single detector output. In spatial scanners, each detector output delivers the spectrum of a narrow strip of the specimen. In spectral scanners, each detector output delivers a monochromatic spatial map of the specimen. In spatial-spectral scanners, each detector output delivers a spectrally encoded spatial map of the specimen.

The hyperspectral two-dimensional measurement involves the advantage that a specimen is measured by means of hyperspectral two-dimensional measurement and an average value of the measured data is subsequently calculated. This average value of the measured data is representative of the hyperspectrally measured specimen. The entire specimen may in this case be measured segment-by-segment by means of hyperspectral two-dimensional measurement, an average value of the associated data being calculated for each segment. The individual segments are in this case adjacent to one another but do not have an overlap with one another. In this way, a digital reference color profile of the entire specimen is compiled. The digital reference color profile in this case has the average values of the measured data in the respective segments. It is furthermore possible for the data of the entire measured specimen to be used in order to calculate an average value of the measured data, which is then representative of the entire specimen.

According to the invention, at least one segment of the analog reference pattern is measured with a hyperspectral two-dimensional measuring instrument and the measurement data are stored. In one embodiment of the present invention, a plurality of segments of the analog reference pattern are measured with a hyperspectral two-dimensional measuring instrument. In one embodiment, from 1 to 10,000 segments, preferably from 1 to 5,000 segments, particularly preferably from 1 to 3,500 segments of the analog reference pattern can be measured with a hyperspectral two-dimensional measuring instrument. In one preferred embodiment, the entire analog reference pattern is measured with a hyperspectral two-dimensional measuring instrument.

In one embodiment, the segments have an area of between 1 $cm^2$ to 10,000 $cm^2$, preferably between 50 $cm^2$ and 200 $cm^2$, particularly preferably between 80 $cm^2$ and 100 $cm^2$.

According to the invention, at least one digital reference color profile is compiled by means of software from the measurement data. As previously described, the reference color profile contains the average values of the measurement data for the measured segment of the analog reference pattern.

Optionally, the color space size of the reference color profile is determined by means of software and stored. In one embodiment of the present invention, the color space size of the reference color profile is determined by means of software and stored. Suitable software for this, for example "Decor Productionserver", a software from Colorgate, is known to a person skilled in the art. As already described in the introduction, various color models may be used in digital printing. Preferably, according to the invention, color models which comprise different primary colors and/or special colors are used. In principle, all color models having from 1 to n primary colors and/or special colors, with n∈N and n≥1, are possible. Preferably, the color models comprise 4, 5, 6 or 7 primary and/or special colors. The primary and/or special colors may in turn consist of from 1 to n dye or ink pigment combinations, with n∈N and n≥1. Conventional pigments, or combinations thereof, are known to a person skilled in the art. In one embodiment of the invention, the color model is selected from the group comprising the CMYK color model, the CRYK color model and the CRY1Y2K color model. According to the color model used, the color space size is determined therein. In this case, the color space size, or gamut, is determined in a linear color system, or color model.

According to the invention, a decoration-specific color profile is furthermore compiled, either from the digital data of a digital decoration or by hyperspectral two-dimensional measurement of at least one segment of an analog decoration, and is stored. According to the invention, all conceivable decorations may be used as digital or analog decorations. Examples of decorations are inter alia wood, tile or fantasy decorations, or parquet imitations. These decorations may, as already described, be in either digital or analog form. Analog decorations according to the present invention are decorations which exist physically. In principle, all types of natural and printed decorations may therefore be used. Examples of such decorations are wood grains of wood decorations and natural stone decorations, which are generated by means of intaglio or digital printing on various printing substrates. Printed decorations are in this case in printed form on a printing substrate. Suitable printing substrates according to the present invention are for example paper, glass, metal, films, wood-based material panels, in particular MDF or HDF panels, WPC panels, veneers, lacquer layers, plastic panels and inorganic carrier panels. Wood-based material panels and paper are preferred according to the invention.

If the decoration is in digital form, for example as a printing file, the decoration-specific color profile is in one embodiment computed from the digital data. Suitable software for this, for example the software Colorgate, is known to a person skilled in the art.

If the decoration is in analog form, on the other hand, according to the present invention a hyperspectral two-dimensional measurement of at least one segment of the analog decoration is carried out. In one embodiment, a plurality of segments of the analog decoration may be measured by means of hyperspectral two-dimensional measurement. In particular, from 1 to 10,000 segments, preferably from 1 to 5,000 segments, particularly preferably from 1 to 3,500 segments of the analog decoration may be measured with a hyperspectral two-dimensional measuring instrument. In one preferred embodiment, the entire analog decoration is measured with a hyperspectral two-dimensional measuring instrument. According to the invention, at least one digital decoration-specific color profile is compiled by means of software from the measurement data. As previously described, the decoration-specific color profile contains the average values of the measurement data for the measured section of the analog decoration.

In one embodiment of the method according to the invention, the color space size of the decoration-specific color profile is additionally determined by means of software and stored. Suitable software for this, for example "Decor Productionserver", a software from the company, is known to a person skilled in the art. The determination of the color space size is in turn based on the color model used. Suitable color models have already been described.

According to the invention, the determination of the color space size of the reference color profile and of the color space size of the decoration-specific color profile is carried out in the same color model. The color space size of the reference color profile and the color space size of the decoration-specific color profile may therefore be compared directly with one another.

Comparison

According to the invention, the reference color profile and the decoration-specific color profile or the color space size of the reference color profile and the color space size of the decoration-specific color profile are compared. The comparison may be carried out in an automated fashion by means of software or manually by a user. A suitable software for the automated performance of the comparison is known to a person skilled in the art, for example the software Colorgate from the company of the same name.

The comparison may also be carried out manually by a user, and in this case is performed based on the user's experience. The user may then initiate further measures on the basis of the comparison result.

In one embodiment of the invention, the differences which exist between the reference color profile and the decoration-specific color profile or between the color space size of the reference color profile and the color space size of the decoration-specific color profile are output as the result of the comparison. In one preferred embodiment, whether the color space of the decoration-specific color profile is contained in the color space of the reference color profile or deviates therefrom fully or partially is output as the result of the comparison.

In the case of deviations of the color space of the decoration-specific color profile from the color space of the reference color profile or of the color space size of the decoration-specific color profile from the color space size of the reference color profile, various reaction options are provided by the invention in order to restore the correspondence between the color spaces. In one embodiment of the invention, on the basis of the result of the comparison of the reference color profile and the decoration-specific color profile or of the color space size of the reference color profile and the color space size of the decoration-specific color profile,     a signal is output; and/or     indications take place for changes to be carried out of the printing parameters in a subsequent printing process; and/or     the printing data of a digital decoration are automatically modified; and/or     a corrected decoration-specific color profile is calculated.

These measures may take place individually or in any desired combination with one another.

On the basis of the comparison result, in one embodiment of the method according to the invention, one or more signals may be output either in an automated fashion or by being initiated by a user. A suitable signal may be an optical signal or alternatively an acoustic signal. This may for example be an acoustic signal output, for example a warning sound or an alarm sound, and/or an optical signal on a display. In another embodiment of the present invention, an interruption of the printing process is also connected with the output of the signal. The signal may give an indication of an undesirably large deviation of the decoration-specific color profile from the reference color profile. The signal may, however, also be output if the comparison reveals that the color space of the decoration-specific color profile is not contained in the color space of the reference color profile.

In another embodiment, an indication takes place for changes to be carried out of the printing parameters in a subsequent printing process. This indication may for example be displayed on a screen. Changes to be carried out of the printing parameters may, for example, be a modified primer application onto the printing substrate before the printing or a modified ink selection.

The primer is used as a foundation of the printing substrate. In order to produce uniformly undercoated printing substrates, in particular wood-based material panels, in one embodiment of the present method at least one foundation layer comprising at least one resin and/or at least one lacquer is applied onto the side to be printed on of the wood-based material panel before the printing with a decoration, and is subsequently dried and/or cured.

Preferably, the side to be printed on of the wood-based material panel is ground before the application of the foundation.

For the foundation, an aqueous resin solution and/or a radiation-curable surfacing compound can be applied onto the side to be printed on of the printing substrate. For example, aqueous resin solutions such as melamine-formaldehyde resin, urea-formaldehyde resin or melamine-urea-formaldehyde resin may be used as the foundation agent. It is likewise possible to pre-coat, or undercoat, the printing substrate with 1K/2K acrylate, UV and/or EBC surfacer, and then accordingly to cure this foundation layer.

Preferably, an aqueous resin solution which an aqueous resin solution, in particular an aqueous solution of a melamine-formaldehyde resin, urea-formaldehyde resin or melamine-urea-formaldehyde resin, is used for the pre-coating or foundation of the wood-based material panel.

The application quantity of liquid resin solution for the foundation may be between 10 and 80 g/m$^2$, preferably 20 and 50 g/m$^2$. The solids content of the aqueous resin solution lies between 30 and 80%, preferably 40 and 60%, and is particularly preferably 55%. The liquid resin may additionally have suitable wetting agents, curing agents, release agents and antifoaming agents.

After the application of the aqueous resin solution onto the wood-based material panel for the pre-coating or foundation thereof, the liquid resin is dried to a moisture content of 10%, preferably 6%, for example in a convection oven or near-infrared oven.

In another embodiment of the present method, the wood-based material panel may be pre-coated, or undercoated, with 1K/2K acrylate and/or EBC surfacer. A UV surfacing compound advantageously consists essentially of UV-curable lacquer components, pigments, reactive diluents and radical formers as chain initiators.

The application quantity of the surfacing compound may in this case be from 50 to 150 g/m$^2$, preferably from 50 to 100 g/m$^2$. The quantity indications in this case refer to a 100% surfacing compound.

It is likewise possible that the surfacing compound used for the foundation is in a pigmented form, in which case the printing result may be varied or improved.

Pre-coating of the wood-based material panel with a transparent foundation is particularly preferred according to the invention.

In another embodiment of the present method, at least one layer of a pigmented foundation, which is preferably water-based, is applied onto the side to be printed on of the wood-based material panel before the printing on the at least one side of the wood-based material panel. The pigmented foundation may be applied either directly onto the untreated surface of the material panel or onto the prior, preferably transparent, foundation.

The water-based pigmented foundation may also be applied in more than one layer (for example from 3 to 10 layers, preferably from 5 to 8 layers, particularly preferably 7 layers), the pigmented foundation being dried after each layer application, for example in a convection dryer or a near-infrared dryer. The water-based pigmented foundation preferably contains at least one pigment of a bright color, particularly preferably at least one white pigment.

White pigments are colorless, inorganic pigments having a high refractive index (more than 1.8), which are primarily used to generate optical whites in paints or as a filler, for example in plastics. White pigments according to the invention may be selected from the group comprising titanium dioxide, lithopone, barium sulfate, zinc oxide, zinc sulfide and calcium sulfate. Lithopone is a white pigment which contains barium sulfate and zinc sulfide. According to the invention, titanium dioxide is preferably used as a white pigment in the water-based pigmented foundation, since titanium dioxide has the highest refractive index and therefore the highest opacity among the known white pigments.

In another embodiment of the present invention, an automatic modification of the printing data of a digital decoration is carried out. The modification of the printing data and/or the indication of changes to be carried out of the printing parameters is used to increase the quality in the printing process.

In another embodiment of the invention, a corrected color profile is calculated by means of a suitable software on the basis of the result of method step f. if the decoration-specific color profile contains colors that are not contained in the reference color profile, or if the color space of the decoration-specific color profile partially or fully does not coincide with the color space of the reference color profile. This corrected color profile may in turn be used for adaptation of the printing data of the digital decoration. In this embodiment, the method according to the invention therefore furthermore comprises the method step of calculating a corrected color profile.

If the decoration-specific color profile contains colors that are not contained in the reference color profile, or if the color space of the decoration-specific color profile partially or fully does not coincide with the color space of the reference color profile, the decoration template or the analog decoration cannot be printed under the conditions used (printing substrate, printing parameters).

Similarity Index

In one embodiment of the present invention, a similarity index is output as the result of the comparison. Very generally, the similarity index represents the deviation between two measurement values. The greater the similarity index is, the less the measurement values deviate from one another. The similarity comparison is carried out by a software on a calculation unit. If the ACMS® method is used for the hyperspectral two-dimensional measurement, the similarity comparison may advantageously be carried out by means of the similarity index of the associated software. This application is known to a person skilled in the art.

The greater the similarity index is, the less the reference color profile and the decoration-specific color profile, or the color space size of the reference color profile and the color space size of the decoration-specific color profile, deviate from one another. Accordingly, the analog reference pattern is truer in color to the digital or analog decoration, and vice versa.

In one embodiment of the present invention, a setpoint value that should not be fallen below is predetermined for the similarity index. The setpoint value is established as a function of the decoration and the colors contained therein. Likewise, the requirement of a customer for the true-color rendition of a decoration may be taken into account by the selection of the setpoint value. The setpoint value is indicated in %, and lies in the range of from 75% to 100%, preferably in the range of from 85% to 100%, particularly preferably in the range of from 89% to 100%. The higher the setpoint value is selected to be, the lower are the color deviations that are tolerated between the analog reference pattern and the digital or analog decoration.

If the similarity index lies below a predetermined setpoint value, various reaction options are provided by the method according to the invention in order to correct the deviations from the setpoint value. Then, the method according to the invention furthermore comprises the steps:
    outputting a signal; and/or
    outputting an indication of changes to be carried out of the printing parameters in a subsequent printing process; and/or
    automatically modifying the printing data of a digital decoration; and/or
    calculating a corrected decoration-specific color profile.

The steps may in this case take place individually or in any desired combination with one another. A suitable signal may be an optical signal or alternatively an acoustic signal. These have already been previously described in detail.

In one embodiment, an indication takes place of printing parameters to be changed in a subsequent printing process if the similarity index lies below a predetermined setpoint value. This indication may for example be displayed on a screen. Changes to be carried out of the printing parameters may, for example, be a modified primer application onto the printing substrate before the printing or a modified ink selection.

In another embodiment of the present invention, an automatic modification of the printing data of a digital decoration is carried out if the similarity index lies below a predetermined setpoint value. The modification of the printing data and/or the indication of changed printing parameters are/is used to make the similarity index higher and therefore to increase the quality in the printing process.

In another embodiment of the invention, if the similarity index lies below a predetermined threshold value, a corrected color profile is calculated by means of a suitable software if the deviation of the reference color profile from the decoration-specific color profile or the deviation of the color space size of the reference color profile from the color space size of the decoration-specific color profile is too great. This corrected color profile may in turn be used for adaptation of the printing data of the digital decoration. In this embodiment, the method according to the invention therefore furthermore comprises the method step of calculating a corrected color profile.

On the basis of the comparison of the reference color profile and the decoration-specific color profile or of the color space size of the reference color profile and the color space size of the decoration-specific color profile, in one embodiment of the invention a quality certificate for a print job may be compiled. The quality certificate for a print job is, for example, compiled by measurement data of the decoration-specific color profile being compared with those of the reference color profile and output as corroboration.

Analog Reference Pattern

The analog reference patterns are, according to the invention, reference patterns which are present on printing substrates. The reference patterns may in this case have any types of decorations, in particular including color profile targets. Further examples of decorations are inter alia wood, tile or fantasy decorations, or parquet imitations.

Suitable printing substrates according to the present invention are for example paper, glass, metal, films, wood-based material panels, in particular MDF or HDF panels, WPC panels, veneers, lacquer layers, plastic panels and inorganic carrier panels. Wood-based material panels and paper are preferred according to the invention.

Ascertaining the Color Space for Analog Reference Patterns

In one embodiment, the analog reference pattern has at least one color profile target. Particularly preferably, the analog reference pattern has color profile targets that have been printed onto a printing substrate under defined printing parameters, in order to determine in the preprinting stage of a printing process the color space which can be printed on the printing substrate with these printing parameters.

The analog reference pattern is generated by
    compiling and storing at least one digital color profile target by means of a software; and
    outputting the at least one digital color profile target onto a printing substrate with an output instrument under defined printing parameters.

In one embodiment, the analog reference pattern has from 1 to 10,000 color profile targets, preferably from 1,000 to 5,000, particularly preferably from 2,500 to 3,500 color profile targets. The color profile targets are in this case according to the invention printed onto a defined printing substrate under defined printing parameters.

The output of the at least one digital color profile target onto a printing substrate may in this case take place by means of digital printing. The digital printing may in this case be carried out directly or indirectly. Particularly preferably, the output takes place by means of digital direct printing.

If the analog reference pattern has color profile targets, in one embodiment of the invention a method having the following steps is provided:
    compiling and storing at least one color profile target by means of a software;
    outputting the at least one color profile target onto a printing substrate with an output instrument under defined printing parameters, the at least one color profile target output onto the printing substrate representing the analog reference pattern;
    measuring and storing measurement data of at least one segment of an analog reference pattern with a hyperspectral two-dimensional measuring instrument;
    compiling at least one reference color profile by means of software;
    optionally determining and storing the color space size of the reference color profile by means of software;
    compiling and storing a digital decoration, the digital decoration having at least one decoration-specific color profile target;
    compiling a decoration-specific color profile from the digital data of the digital decoration;
    optionally determining and storing the color space size of the decoration-specific color profile by means of software;

comparing the reference color profile and the decoration-specific color profile or the color space size of the reference color profile and the color space size of the decoration-specific color profile.

According to the invention, at least one segment of the analog reference pattern is measured with a hyperspectral two-dimensional measuring instrument. Particularly preferably, in this embodiment the entire analog reference pattern is measured segment-by-segment with a hyperspectral two-dimensional measuring instrument. A segment in this case preferably has a color profile target. Particularly preferably, a segment corresponds to precisely one color profile target. Consequently, all color profile targets of the analog reference pattern are measured with a hyperspectral two-dimensional measuring instrument.

In another embodiment of the invention, a digital decoration is compiled from the data of a digital decoration template or by hyperspectral two-dimensional measurement of at least one segment of an analog decoration. The compilation of the digital decoration from the data of a digital decoration template is implemented by software already known from the prior art. According to the invention, the digital decoration has at least one decoration-specific color profile target. A digital decoration template is in this case intended to mean a decoration whose printing data are in digital form, for example in a printing file. Examples of decorations of the digital decoration template are inter alia wood, tile or fantasy decorations, or parquet imitations.

If the digital decoration is generated from an analog decoration, according to the present invention a hyperspectral two-dimensional measurement of at least one segment of the analog decoration is carried out. In one embodiment, a plurality of segments of the analog decoration may be measured by means of hyperspectral two-dimensional measurement. In particular, from 1 to 10,000 sections, preferably from 1 to 5,000 segments, particularly preferably from 1 to 3,500 segments of the analog decoration may be measured with a hyperspectral two-dimensional measuring instrument. In one preferred embodiment, the entire analog decoration is measured with a hyperspectral two-dimensional measuring instrument. A digital decoration, which has at least one decoration-specific color profile target, is generated from the measurement data. As already described, the decoration-specific color profile target contains the average values of the measurement data for the measured segment of the analog decoration. Preferably, the analog decoration is subjected to a hyperspectral two-dimensional measurement in such a way that a plurality of decoration-specific color profile targets are compiled. Preferably, so many decoration-specific color profile targets are compiled that at least a part of the color space of the analog decoration is represented by the decoration-specific color profile targets. In one embodiment, a part of the color space means that from 50% to 99%, preferably from 75% to 99%, particularly preferably from 85% to 99% of the color space of the analog decoration is represented by the decoration-specific color profile targets. Particularly preferably, so many decoration-specific color profile target are compiled that the entire color space of the analog decoration is represented by the decoration-specific color profile targets. This may for example be done by subdividing the entire analog decoration into segments, each of the segments being measured by a hyperspectral two-dimensional measurement, the average value of the measurement data being calculated for each segment, and it therefore being possible to assign a decoration-specific color profile target to each segment.

A decoration-specific color profile is compiled by means of software from the digital data of the digital decoration. A software suitable for this, for example the software Colorgate from the company of the same name, is known to a person skilled in the art. Optionally, the color space size of the decoration-specific color profile is determined by means of software and stored.

According to the invention, the reference color profile and the decoration-specific color profile or the color space size of the reference color profile and the color space size of the decoration-specific color profile are compared with one another. The performance of the comparison may be carried out as already described.

If the reference pattern contains the color profile targets for the printing onto a defined printing substrate under defined printing parameters, this reflects the color space that can be printed under the conditions used. If the digital decoration contains the decoration-specific color profile targets of a digital decoration, a conclusion may be drawn about the ability to print the underlying decoration template or the underlying analog decoration onto the defined printing substrate under the defined printing conditions. For this, the reference color profile and the decoration-specific color profile or the color space size of the reference color profile and the color space size of the decoration-specific color profile are compared with one another.

If the decoration-specific color profile contains colors that are not contained in the reference color profile, or if the color space of the decoration-specific color profile partially or fully does not coincide with the color space of the reference color profile, the decoration template or the analog decoration cannot be printed under the conditions used (printing substrate, printing parameters).

The color space of the decoration-specific color profile must be contained in the color space of the reference profile so that all colors that are contained in the decoration template or in the analog decoration can be printed under the conditions used (printing substrate, printing parameters).

If the color spaces in question deviate from one another, the result of the comparison leads to the output of a signal, as already described.

The method according to the invention has, in particular, the advantage that the color values of a printed color profile target are not just registered pointwise, as with the methods known from the prior art, but a two-dimensional measurement is carried out. From the hyperspectrally measured area, according to the invention an average value is formed, which then represents the color value of the color profile target. Inaccuracies due to an inhomogeneous coloration of an analog color profile target may thereby be avoided. In this way, the accuracy in the determination of color profiles and color spaces in the preprinting stage is substantially increased.

The risk of limitation or clipping of the color space in the preprinting stage, as explained in the introduction, is therefore substantially reduced by the method according to the invention. Advantageously, not just a purely optical system but a hyperspectral two-dimensional measuring instrument is used for the measurement of the analog reference pattern and of the analog decoration. Because of the parameters of the chips and sensors used, optical measurement systems offer only restricted possibilities for registering the color profile or color space of decorations. A hyperspectral two-dimensional measuring instrument registers substantially more measurement data and therefore in turn increases the data quality that is available in order to calculate a color profile or a color space. The method according to the invention may therefore be used for color space determination in the preprinting stage.

Prototype

A hyperspectral two-dimensional measurement may furthermore be used in many other production steps such as design, prototype production, production monitoring, impregnation, pressing or floor profiling, in order to hyperspectrally measure a decoration two-dimensionally and compare the measurement data with a prototype existing for the respective process step, and if appropriate, in the event of deviations, to adapt the production parameters and/or control them manually or in an automated fashion, to output signals or even for example to prompt the sorting of batches manually or in an automated fashion, for example according to color ranges.

Furthermore, the method according to the invention may be used for compiling a prototype and for quality matching with this prototype in respect of color fidelity in the further printing process.

In another embodiment, the analog reference pattern is selected from the group containing
  digital decoration printed onto printing substrate;
  digital decoration processed further and printed onto printing substrate;
the further processing comprising the steps of impregnating, pressing and/or profiling the printing substrate, either individually or in combination.

The analog reference pattern is, in one embodiment, generated by the output of a digital decoration under defined printing parameters onto a printing substrate. Suitable digital decorations have already been described. The digital decoration in this case constitutes at least one segment of a repeat pattern of a decoration, or particularly preferably the entire repeat pattern. According to the invention, at least one segment of the analog reference pattern is measured with a hyperspectral two-dimensional measuring instrument. In one embodiment, the entire analog reference pattern is measured with a hyperspectral two-dimensional measuring instrument. A reference color profile is compiled from the measurement data. This may be used as a prototype.

If the digital decoration on which the analog reference pattern is based is printed onto a printing substrate in the further production process, according to the invention a decoration-specific color profile is compiled from a printed decoration in method step d. by hyperspectral two-dimensional measurement of at least one segment of the printed decoration. The segment or the segments of the printed decoration, which are used for the compilation of the decoration-specific color profile, are in this case preferably equivalent to the segment or the segments of the analog reference pattern that are used for the compilation of the reference color profile.

Furthermore, the analog reference pattern may be a further-processed digital decoration printed on printing substrate. Further-processing steps may in this context, for example, be pressing the printed printing substrate with a further carrier substance, for example a wood-based material panel, or with an impregnation layer, impregnating the printed printing substrate or profiling the printed printing substrate. The further-processing steps may respectively be applied individually or in combination with one another. In particular, the pressing may take place in a short-cycle press (SC press)

During impregnation, at least one protective layer, preferably two or three layers, comprising abrasion-resistant particles, natural fibers, synthetic fibers and/or further additives may be applied onto the decoration printed onto the printing substrate, in which case resins such as melamine-formaldehyde resin, urea-formaldehyde resin, acrylate resins and polyurethane resins may be used as suitable binders.

The abrasion-resistant particles are preferably selected from the group containing aluminum oxides, corundum, borocarbides, silicon dioxides, silicon carbides and glass beads. Natural and/or synthetic fibers which may be used are, in particular, fibers selected from the group containing wood fibers, cellulose fibers, wool fibers, hemp fibers and organic or inorganic polymer fibers.

Additives which may be added are conductive substances, flame retardants, luminescent substances and metals. Conductive substances may in this case be selected from the group containing carbon black, carbon fibers, metal powders and nanoparticles, in particular carbon nanotubes. Combinations of these substances may also be used. Phosphates, borates, in particular ammonium polyphosphate, tris(tribromoneopentyl)phosphate, zinc borate or boric acid complexes of polyvalent alcohols are preferably used as flame retardants. Fluorescent and/or phosphorescent substances on an inorganic or organic basis, in particular zinc sulfite and alkaline earth metal aluminates, are preferably used as luminescent substances.

In another embodiment of the present method, the printed decoration printed onto a printing substrate and if appropriate provided with a protective layer, in particular consisting of formaldehyde resins, is processed further, or refined, in a short-cycle (SC) press. In the SC press, the resin layers are melted and the layer composite is cured to form a laminate. During the further processing in the SC press, surface structures may also be generated by using a structured press plate in the surface of the carrier material, such as a wood-based material panel, which may optionally be configured to match the decoration (so-called decoration-synchronous structure). This further-processing step is also referred to as profiling. In the case of wood decorations, the structures may be in the form of pore structures that follow the grain. In many decorations, the structures may be depressions in the region of joint filling lines which the decoration comprises.

According to the invention, at least one segment of the analog reference pattern is measured in step a. with a hyperspectral two-dimensional measuring instrument and a reference color profile is compiled from the measurement data in method step b. This reference profile may be used as a prototype.

The digital decoration on which the analog decoration is based is applied again onto a printing substrate and processed further in the further production process. According to the method according to the invention, the printed and further-processed decoration is used as an analog decoration, from which a decoration-specific color profile is compiled in method step d. by hyperspectral two-dimensional measurement of at least one segment of the printed decoration. Preferably, the prototype and the analog decoration have been printed onto similar printing substrates and further processed in a similar way.

By the comparison of the prototype and the decoration-specific color profile according to method step f., an in-line quality test in relation to a prototype may therefore be carried out in the printing process. This quality test ensures a high color fidelity throughout the printing process and during the further-processing steps. In one preferred embodiment, the result of the comparison in method step f. is output by a similarity index. By establishing a setpoint value for the similarity index, as already described, the desired color fidelity may therefore be established and tested in the printing process.

In the event of deviations of the decoration-specific color profile from the prototype, in one embodiment of the invention a signal may be output. Suitable signals have already been described.

In another embodiment, in the event of a deviation of the decoration-specific color profile from the prototype, on the basis of the result of method step f. a corrected color profile is calculated by means of a suitable software if the deviation of the reference color profile from the decoration-specific color profile or the deviation of the color space size of the reference color profile from the color space size of the decoration-specific color profile is too great. This corrected color profile may be used for the further printing process of the decoration, so that the color fidelity with respect to the prototype can be improved. In this embodiment, the method according to the invention therefore furthermore comprises the method step of calculating a corrected color profile.

By the method according to the invention, a high color fidelity is ensured in the entire printing process. This may be used in order to certify print jobs. In one embodiment of the invention, a quality certificate for a print job is compiled by measurement data of the decoration-specific color profile being compared with those of a prototype and output as corroboration.

Furthermore, the method according to the invention may be used in the monitoring of a printing process and the subsequent further-processing steps such as impregnating, pressing and/or profiling printed decorations. For this, in one embodiment of the invention hyperspectral two-dimensional measurements can be carried out after the various further-processing steps. The printed decorations may therefore be used after the various further-processing steps as analog decorations according to method step d., so that decoration-specific color profiles of these analog decorations may be compiled. These decoration-specific color profiles may, according to the invention, be compared with corresponding prototypes according to method step f.

A further application of the method according to the invention is in complaint monitoring. In the event of complaints, the analog decoration which is the subject of the complaint may be used according to method step d. in order to compile a decoration-specific color profile. This decoration-specific color profile may be compared with a corresponding prototype, so that an objective assessment of a complaint question becomes possible.

The present invention furthermore comprises a device, in particular a printing apparatus, which is configured to carry out a method as claimed in one of claims 1 to 12 for comparing a reference color profile or the color space size of the reference color profile of an analog reference pattern with a decoration-specific color profile or the color space size of the decoration-specific color profile of a digital or analog decoration. The device comprises
- at least one hyperspectral two-dimensional measuring instrument;
- at least one calculation unit;
- optionally at least one means for printing a decoration template, a digital color profile target and/or a digital decoration;
- optionally at least one means for further processing the decoration template printed onto a printing substrate or the decoration printed onto a printing substrate.

In one embodiment, the device comprises a hyperspectral two-dimensional measuring instrument. Suitable instruments have already been described. In another embodiment, the device comprises at least one means for further processing the decoration template printed onto a printing substrate or the decoration printed onto a printing substrate. Such a means for further processing is preferably selected from the group comprising a device for impregnation, a device for pressing the printed printing substrate with further layers, for example an impregnation layer, and a device for profiling the printed printing substrate.

In one particularly preferred embodiment, the pressing means is a short-cycle press (SC press). In another preferred embodiment, the profiling means is likewise a short-cycle press, and particularly preferably the short-cycle press with which the pressing is carried out is also used for the profiling. Further processing in the case of impregnation, pressing and profiling has already been described in detail.

In one embodiment, the device comprises a plurality of means for further processing, in which case one hyperspectral two-dimensional measuring instrument is particularly preferably provided for measuring a printing substrate provided with a decoration and at least one further hyperspectral two-dimensional measuring instrument is provided for measuring the printing substrate printed on with a decoration after at least one further-processing step.

The means for printing a decoration template, a digital color profile target and/or a digital decoration is, in one embodiment, a digital printer.

The features of the method also apply to the device according to the invention, and vice versa. In particular, the device may be employed in all uses of the method according to the invention just like the method.

The present invention will be explained in more detail below with the aid of 2 figures and 3 exemplary embodiments.

DESCRIPTION OF THE INVENTION

Figure 1:
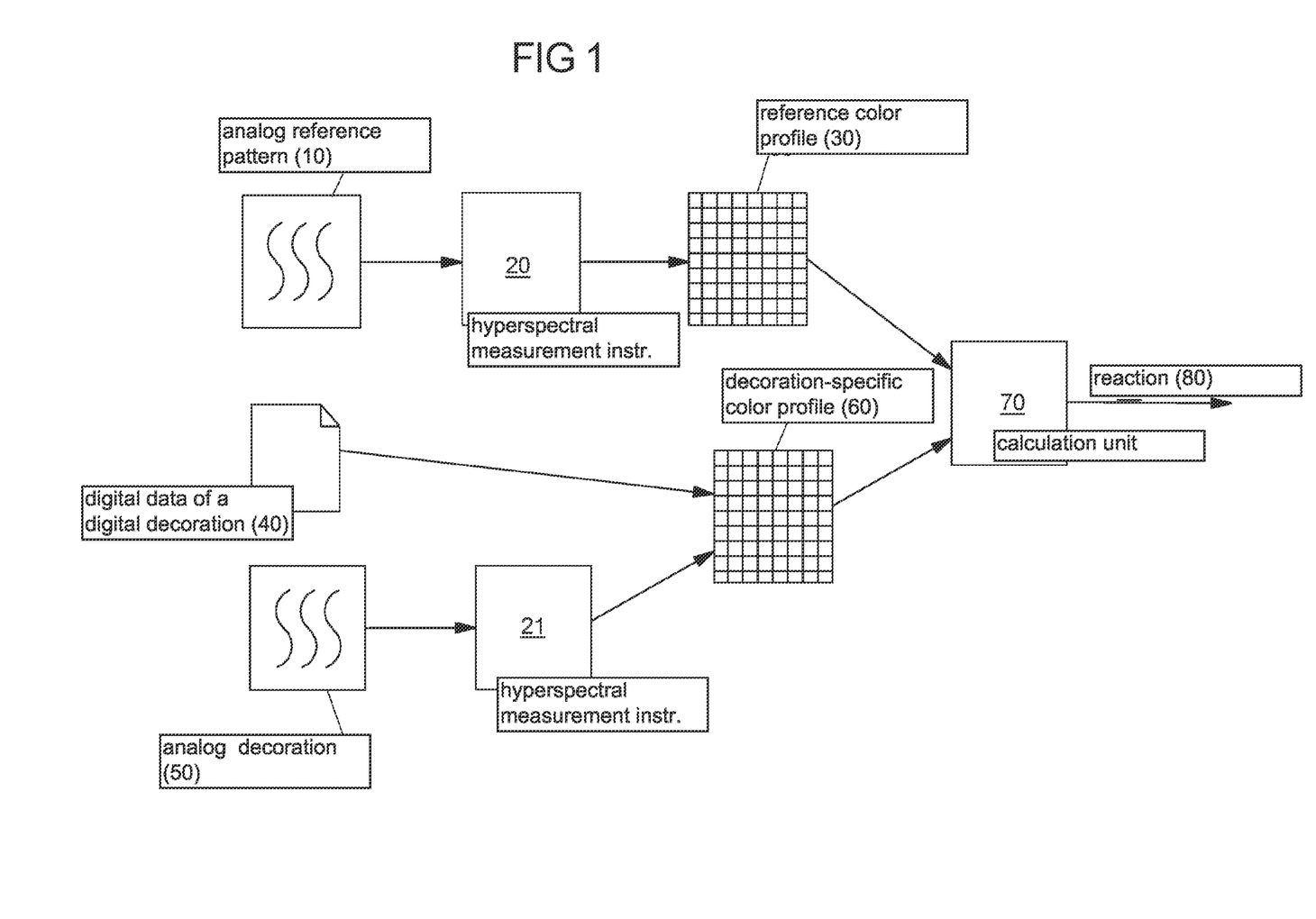
FIG. 1 schematically represents one embodiment of the method according to the invention.

FIG. 1 schematically represents one embodiment of the method according to the invention. The analog reference pattern 10 is measured segment-by-segment by means of a hyperspectral two-dimensional measuring instrument 20. A reference color profile 30 is subsequently compiled from the measurement data. Furthermore, either a decoration-specific color profile 60 is calculated from the digital data of a digital decoration 40 or an analog decoration 50 is measured segment-by-segment by means of a hyperspectral two-dimensional measuring instrument 21 and the decoration-specific color profile 60 is calculated from the measurement data. By means of a calculation unit 70, the reference color profile and the decoration-specific color profile are compared with one another. If deviations are in this case ascertained between the reference color profile and the decoration-specific color profile, a reaction 80 takes place. According to the invention, in this case
- a signal may be output; and/or
- indications may take place for changes to be carried out of the printing parameters in a subsequent printing process; and/or
- the printing data of a digital decoration may be automatically modified; and/or a corrected decoration-specific color profile may be calculated.

Figure 2:
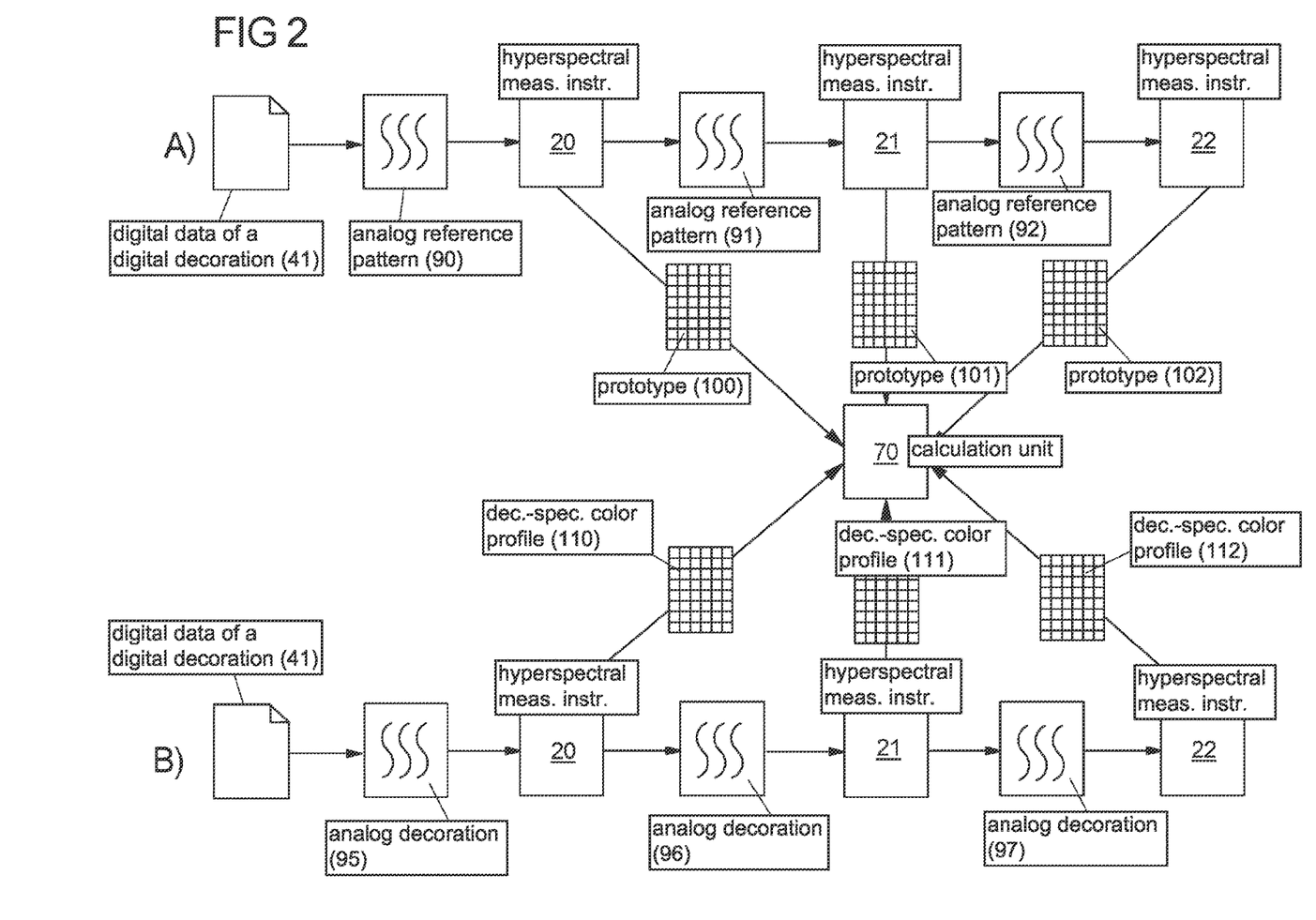
FIG. 2 schematically represents another embodiment of the method according to the invention.

FIG. 2 schematically represents another embodiment of the method according to the invention. Part A of FIG. 2 represents the generation of prototypes 100, 101, 102. With the digital data of a digital decoration 41, an analog reference pattern 90 is printed with a digital printer. The analog reference pattern 90 is measured segment-by-segment with a hyperspectral two-dimensional measuring instrument 20 and a reference color profile 100, which at the same time constitutes a prototype 100, is compiled from the measurement data. The analog reference pattern 90 is impregnated in a further-processing step, and an impregnated analog reference pattern 91 is obtained. The impregnated analog reference pattern 91 is measured segment-by-segment with the aid of a hyperspectral two-dimensional measuring instrument 21 and a reference color profile 101, which at the same time constitutes a prototype 101, is compiled from the measurement data. The impregnated analog reference pattern 91 is pressed and simultaneously profiled in another further-processing step in a short-cycle press, and a further-processed analog reference pattern 92 is obtained. The analog reference pattern 92 is measured segment-by-segment with the aid of a hyperspectral two-dimensional measuring instrument 22 and a reference color profile 102, which at the same time constitutes a prototype 102, is compiled from the measurement data. The prototypes 100, 101, 102 are stored on the calculation unit 70.

The further course of the method is represented in part B of FIG. 2. With the digital data of the digital decoration 41, an analog decoration 95 is printed with a digital printer. Preferably, the same digital printer as in part A of FIG. 2 is used for this. Furthermore, the printing substrate onto which the digital decoration is printed and the printing parameters used are identical to those in part A of FIG. 2. The analog decoration 95 is measured segment-by-segment with a hyperspectral two-dimensional measuring instrument 20, and a decoration-specific color profile 110 from the measurement data. The segments of the analog decoration 95 that are used correspond in this case to the segments of the analog reference pattern 90 that were used during the compilation of the prototype 100. Through a comparison of the prototype 100 with the decoration-specific color profile 110 by the calculation unit 70, deviations between the prototype 100 and the decoration-specific color profile 110 can be established. The true-color rendition of the the digital data of the digital decoration 41 in different printing processes can therefore be monitored. If deviations are established, action may be taken by the reaction options already described.

The analog decoration 95 is impregnated in a further-processing step, and an impregnated analog decoration 96 is obtained. The impregnated analog decoration 96 is measured segment-by-segment with the aid of a hyperspectral two-dimensional measuring instrument 21, and a decoration-specific color profile 111 is compiled from the measurement data. In this step, the segments of the impregnated analog decoration 96 that are used correspond to the segments of the analog reference pattern 91 that were used during the compilation of the prototype 101. Through a comparison of the prototype 101 with the decoration-specific color profile 111 by the calculation unit 70, deviations between the prototype 101 and the decoration-specific color profile 111 may in turn be established.

The impregnated analog decoration 96 is pressed and simultaneously profiled in another further-processing step in a short-cycle press, and a further-processed analog decoration 97 is obtained. The analog decoration 97 is measured segment-by-segment with the aid of a hyperspectral two-dimensional measuring instrument 22, and a decoration-specific color profile 112 is compiled from the measurement data. If the measured segments of the analog decoration 97 correspond to the segments that were used during the compilation of the prototype 102, the prototype 102 and the decoration-specific color profile 112 may be compared with one another in order to ascertain color deviations between them. The calculation unit 70 is again used for this.

Exemplary Embodiment 1—Preprinting Stage

In flooring production, the method is used for example in the preprinting stage of a paper digital printer. In order to be able to print decorations on the printing substrate, in this case paper, the paper initially needed to be profiled in order to define the color space that can be achieved on the paper under particular printing parameters. For this, digital color profile targets were generated with a suitable software and printed onto the paper under defined printing parameters. The color profile targets were in this case arranged in such a way that they can be read in with the hyperspectral two-dimensional measuring instrument. In one example, 3,000 color profile targets were printed onto the paper, each color profile target having an area of 0.5 cm$^2$. The color profile targets printed onto the paper therefore constitute the analog reference pattern. This analog reference pattern was measured segment-by-segment with a hyperspectral two-dimensional measuring instrument. A segment in this case corresponded respectively to the area of one color profile target. In total, 3,000 segments and therefore all color profile targets were measured. The measuring instrument, by virtue of hyperspectral two-dimensional measurement, used an average value from the entire color profile target and therefore provided a representative color value. The reference color profile was compiled on the basis of these measurement data by a software.

A particular decoration suitable for use in the field of flooring was intended to be printed onto the paper. This decoration was in digital form. 3,000 decoration-specific color profile targets were compiled from the digital decoration by a software and stored. A decoration-specific color profile was then compiled from the 3,000 decoration-specific color profile targets with a software.

The comparison of the reference color profile and the decoration-specific color profile showed that the decoration-specific color profile contained no color values that were not also contained in the reference color profile. The decoration was therefore printable onto the paper under the printing parameters used.

Exemplary Embodiment 2—Production Monitoring

This exemplary embodiment illustrates production monitoring when printing on wood-based material panels for flooring applications. A hyperspectral two-dimensional measuring instrument was installed inside the production apparatus. During the print jobs, color profile targets were co-printed at the edge. These were measured by the hyperspectral two-dimensional measuring instrument during production. The measurement was carried out in-line, before the further processing, on the decorations printed onto the printing substrates. The measurement was furthermore carried out off-line after the further processing of the decorations printed onto the printing substrates. A segment that was hyperspectrally measured in this case corresponded to a color profile target. A decoration-specific color profile was compiled from the measurement data. The decoration-specific color profile was compared with a previously compiled prototype, which contained the reference color profile for this decoration. In the event of color deviations from a prototype, acoustic signals sounded and the production was interrupted. Furthermore, a corrected color profile and therefore also new printing data were generated by means of software on the basis of the decoration-specific color profile and the prototype, and the production was continued with the corrected printing data.

Exemplary Embodiment 3—Further Processing

This exemplary embodiment illustrates the monitoring of decoration printing in the further processing of wood-based material panels for flooring applications. After the further production steps of impregnation, SC pressing, sawing and profiling, further hyperspectral two-dimensional measuring instruments were installed and hyperspectral two-dimensional measurements were carried out with them. After the respective further-processing steps, hyperspectral two-dimensional measurements of a segment of the analog decoration were respectively carried out with the hyperspectral two-dimensional measuring instruments. Decoration-specific color profiles were respectively compiled from these hyperspectral two-dimensional measurements. The decoration-specific color profiles were compared with a previously compiled prototype of the same segment of the decoration. If a deviation between the decoration-specific color profile and the prototype was established, an acoustic signal sounded and the production was interrupted. A corrected color profile and therefore also new printing data were generated by means of software on the basis of the decoration-specific color profiles and the prototype, and the production was continued with the corrected printing data. In addition, color-based batch sorting was carried out at the end of all production steps. In this way, it was possible to make color-based sorting possible for the delivery of the products.

LIST OF REFERENCES 10 analog reference pattern
20, 21, 22 hyperspectral two-dimensional measuring instrument
30 reference color profile
40, 41 digital data of a digital decoration
50 analog decoration
60 decoration-specific color profile
70 calculation unit
80 reaction
90, 91, 92 analog reference pattern
95, 96, 97 analog decoration
100, 101, 102 prototype
110, 111, 112 decoration-specific color profiles

The invention claimed is:

1. A method for comparing a reference color profile or a color space size of the reference color profile of an analog reference pattern with a decoration-specific color profile or a color space size of the decoration-specific color profile of a digital or analog decoration, wherein a color space is determined in a linear color system, wherein the method comprises the steps of:
   a. reading in and storing measurement data of at least one segment of the analog reference pattern with a hyperspectral two-dimensional measuring instrument;
   b. compiling the reference color profile by means of software, wherein the reference color profile comprises one or more average values of the measurement data of the at least one segment;
   c. determining and storing the color space size of the reference color profile by the means of software;
   d. compiling and storing the decoration-specific color profile either from digital data of a digital decoration or by hyperspectral two-dimensional measurement of at least one section of the analog decoration, wherein the decoration-specific color profile comprises the one or more average values of the measurement data of the at least one section;
   e. determining and storing the color space size of the decoration-specific color profile by the means of software; and
   f. comparing the color space size of the reference color profile and the color space size of the decoration-specific color profile, wherein the analog reference pattern comprises at least one color profile target and is generated by:
      compiling and storing at least one digital color profile target; and
      outputting the at least one digital color profile target onto a printing substrate with a digital printer under defined printing parameters.

2. The method as claimed in claim 1, wherein the analog reference pattern has at least one color profile target and is generated as follows:
   compiling and storing at least one digital color profile target by the means of a software.

3. The method as claimed in claim 2, wherein the analog reference pattern has from 1 to 10,000 color profile targets, preferably from 1,000 to 5,000, particularly preferably from 2,500 to 3,500 color profile targets.

4. The method as claimed in claim 2, wherein the method comprises the steps of:
   compiling and storing the at least one color profile target by the means of software;
   outputting the at least one color profile target onto the printing substrate with the digital printer under defined printing parameters, the at least one color profile target output onto the printing substrate representing the analog reference pattern;
   measuring and storing the measurement data of the at least one segment of the analog reference pattern with the hyperspectral two-dimensional measuring instrument;
   compiling the at least one reference color profile by the means of software;
   determining and storing the color space size of the reference color profile by the means of software;
   compiling and storing a digital decoration, the digital decoration having at least one decoration-specific color profile target;
   compiling a decoration-specific color profile from digital data of the digital decoration;
   determining and storing the color space size of the decoration-specific color profile by the means of software; and
   comparing the reference color profile and the decoration-specific color profile or the color space size of the reference color profile and the color space size of the decoration-specific color profile.

5. The method as claimed in claim 4, wherein the digital decoration is compiled from the digital data of a decoration template or by hyperspectral two-dimensional measurement of the at least one segment of the analog decoration.

6. The method as claimed in claim 1, wherein the analog reference pattern is selected from a group containing:
the digital decoration printed onto printing substrate; and
the digital decoration processed further and printed onto printing substrate;
wherein further processing comprises the steps of impregnating, pressing and/or profiling the printing substrate, either individually or in combination.

7. The method as claimed in claim 1, wherein a comparison of the reference color profile and the decoration-specific color profile or of the color space size of the reference color profile and the color space size of the decoration-specific color profile is carried out in an automated fashion by the means of software or manually.

8. The method as claimed in claim 1, wherein an event of deviations of the reference color profile from the decoration-specific color profile or of the color space size of the reference color profile from the color space size of the decoration-specific color profile:
a signal is output; and/or
indications take place for changes to be carried out of one or more printing parameters in a subsequent printing process; and/or
printing data of the digital decoration are automatically modified; and/or
a corrected decoration-specific color profile is calculated.

9. The method as claimed in claim 1, wherein a similarity index is output as a result of a comparison of the reference color profile and the decoration-specific color profile or of the color space size of the reference color profile and the color space size of the decoration-specific color profile.

10. The method as claimed in claim 9, wherein, if the similarity index lies below a predetermined setpoint value, the method furthermore comprises the steps of:
outputting a signal;
outputting an indication for changes to be carried out of the one or more printing parameters in a subsequent printing process;
automatically modifying the printing data of the digital decoration; or
calculating a corrected decoration-specific color profile.

11. The method as claimed in claim 1, wherein the analog reference pattern and/or the analog decoration is located on a printing substrate or is output onto a printing substrate, the printing substrate being selected from a group containing paper, glass, metal, films, wood-based materials, MDF panels, HDF panels, WPC panels, veneers, lacquer layers, plastic panels, or inorganic carrier panels.

12. The method as claimed in claim 1, wherein a quality certificate is compiled as a result of a comparison of the reference color profile and the decoration-specific color profile or of the color space size of the reference color profile and the color space size of the decoration-specific color profile, the measurement data of the decoration-specific color profile being compared with the measurement data of the reference color profile and output as corroboration.

13. A device, in particular a digital printer, configured to compare a reference color profile or a color space size of the reference color profile of an analog reference pattern with a decoration-specific color profile or the color space size of the decoration-specific color profile of a digital or analog decoration, comprising:
at least one hyperspectral two-dimensional measuring instrument; and
at least one means for printing a decoration template, a digital color profile target and/or a digital decoration; or
at least one means for further processing the decoration template printed onto a printing substrate or the decoration printed onto the printing substrate, the device further configured to:
a. read in and store measurement data of at least one segment of the analog reference pattern with a hyperspectral two-dimensional measuring instrument;
b. compile the reference color profile by means of software, wherein the reference color profile comprises one or more average values of the measurement data of the at least one segment;
c. determine and store the color space size of the reference color profile by the means of software;
d. compile and store the decoration-specific color profile either from digital data of a digital decoration or by hyperspectral two-dimensional measurement of at least one section of the analog decoration, wherein the decoration-specific color profile comprises the one or more average values of the measurement data of the at least one section;
e. determine and store the color space size of the decoration-specific color profile by the means of software; and
f. compare the color space size of the reference color profile and the color space size of the decoration-specific color profile, wherein the analog reference pattern comprises at least one color profile target and is generated by:
compiling and storing at least one digital color profile target; and
outputting the at least one digital color profile target onto a printing substrate with a digital printer under defined printing parameters.

* * * * *

UNITED STATES PATENT AND TRADEMARK OFFICE
CERTIFICATE OF CORRECTION

| | |
|---|---|
| PATENT NO. | : 12,088,775 B2 |
| APPLICATION NO. | : 18/038301 |
| DATED | : September 10, 2024 |
| INVENTOR(S) | : Sebastian Dicke |

It is certified that error appears in the above-identified patent and that said Letters Patent is hereby corrected as shown below:

In the Claims

Column 23, Line 41, Claim 10, delete "modifying the" and insert -- modifying --

Signed and Sealed this
Nineteenth Day of November, 2024

*Katherine Kelly Vidal*

Katherine Kelly Vidal
*Director of the United States Patent and Trademark Office*